Aug. 6, 1940.  H. O. DAY  2,210,143
TRUCK DUMPING MECHANISM
Original Filed Dec. 29, 1937  3 Sheets-Sheet 1
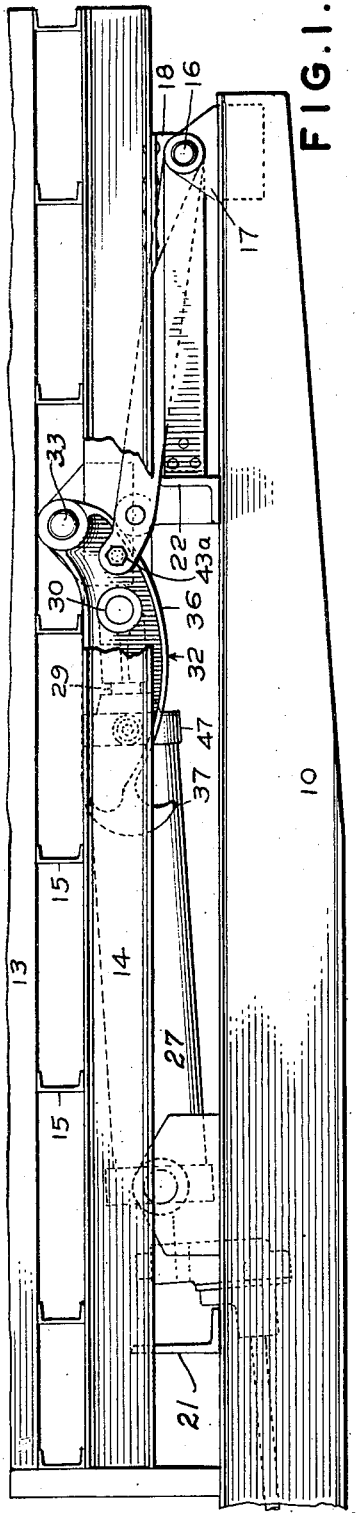
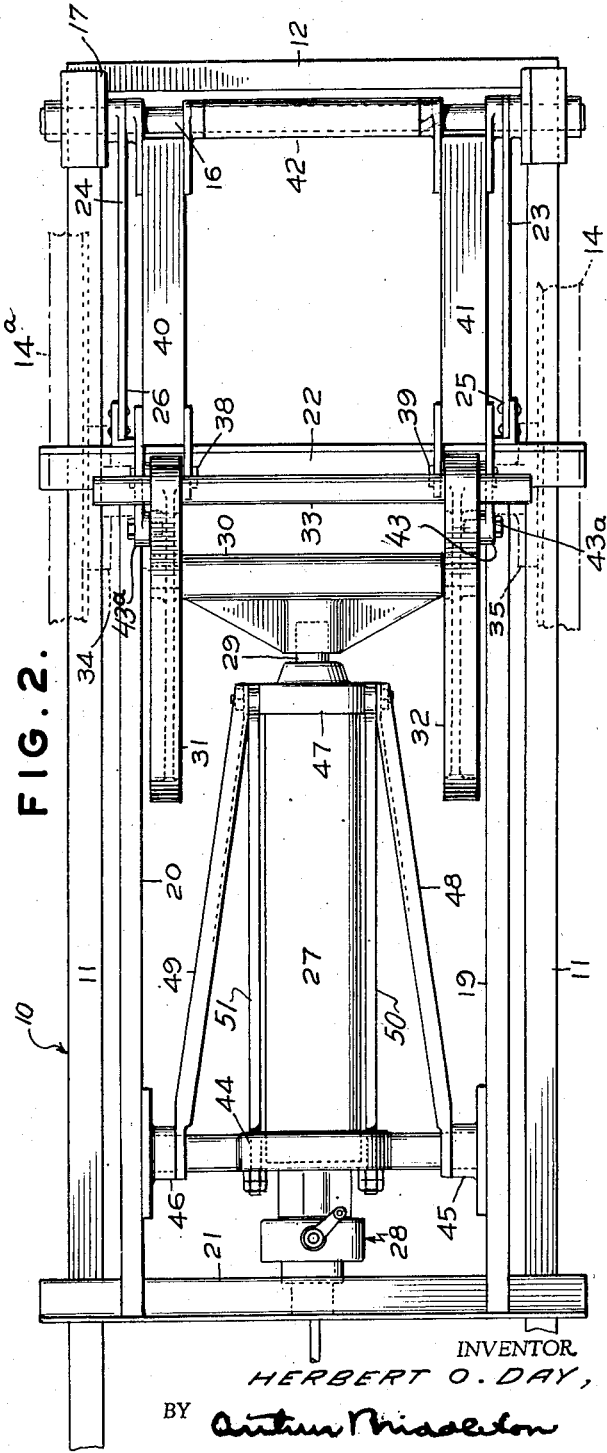
INVENTOR
HERBERT O. DAY,
BY Arthur Middleton
ATTORNEY.

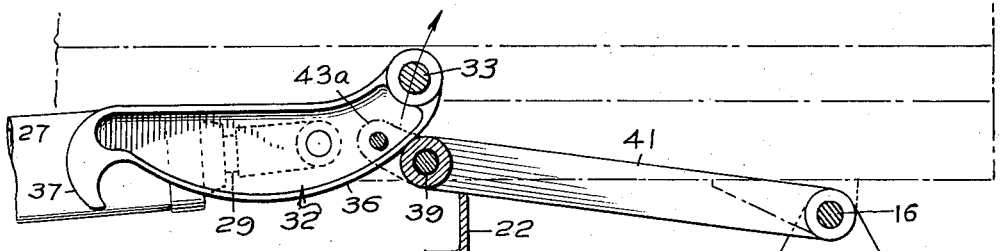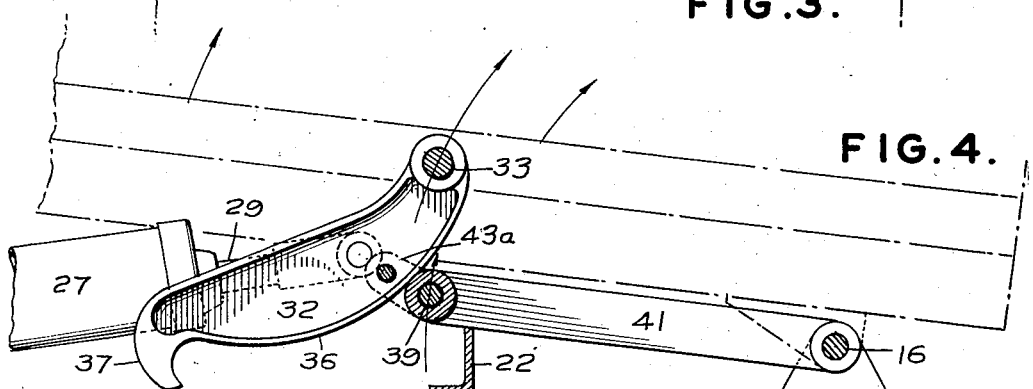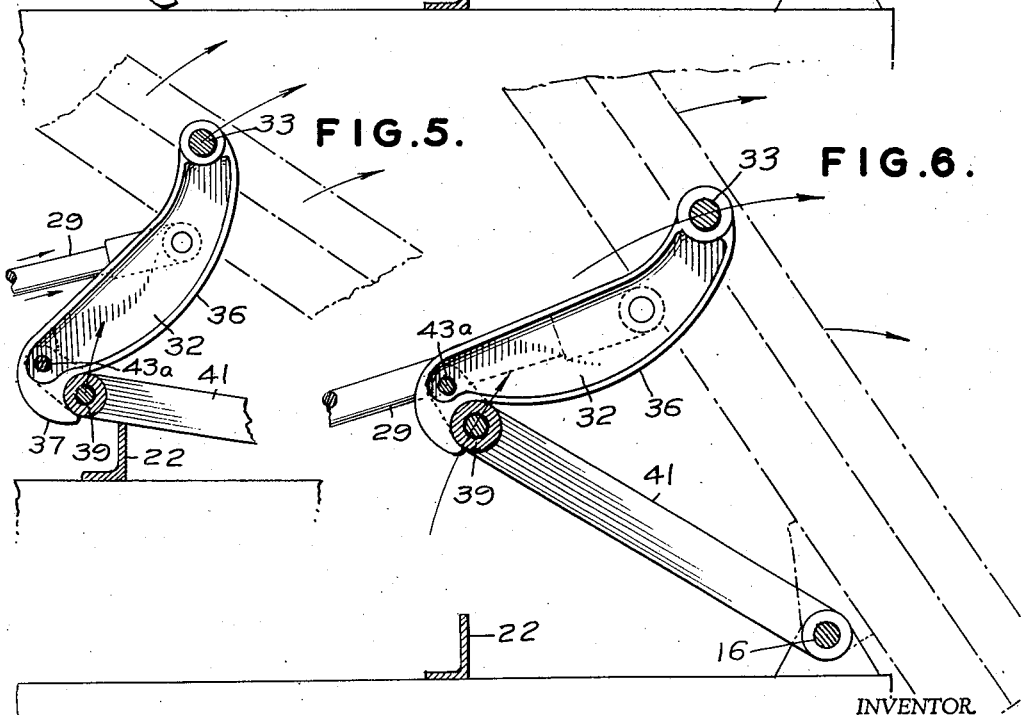

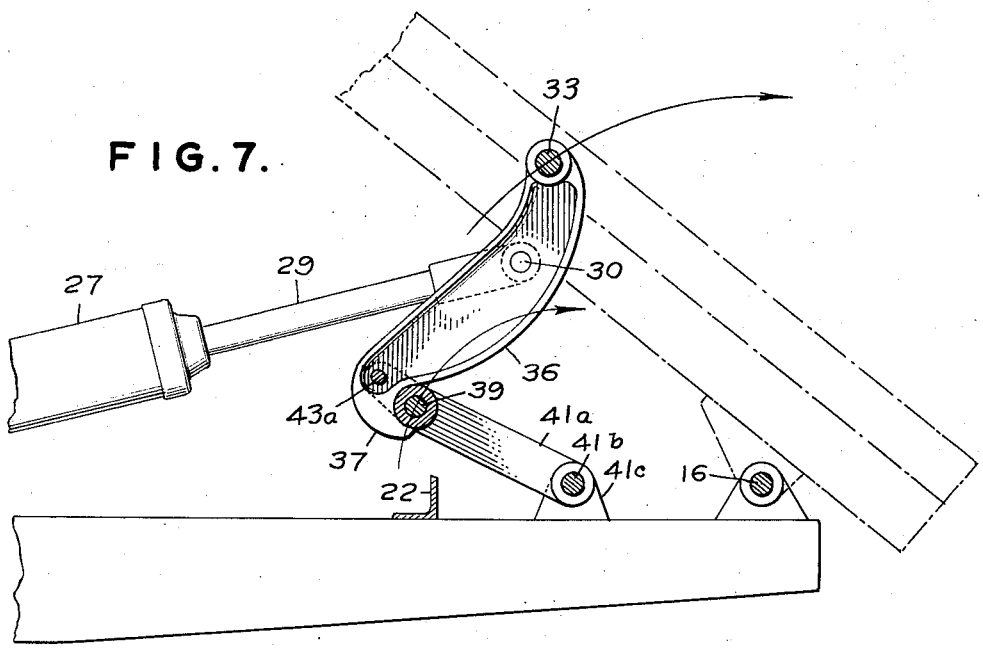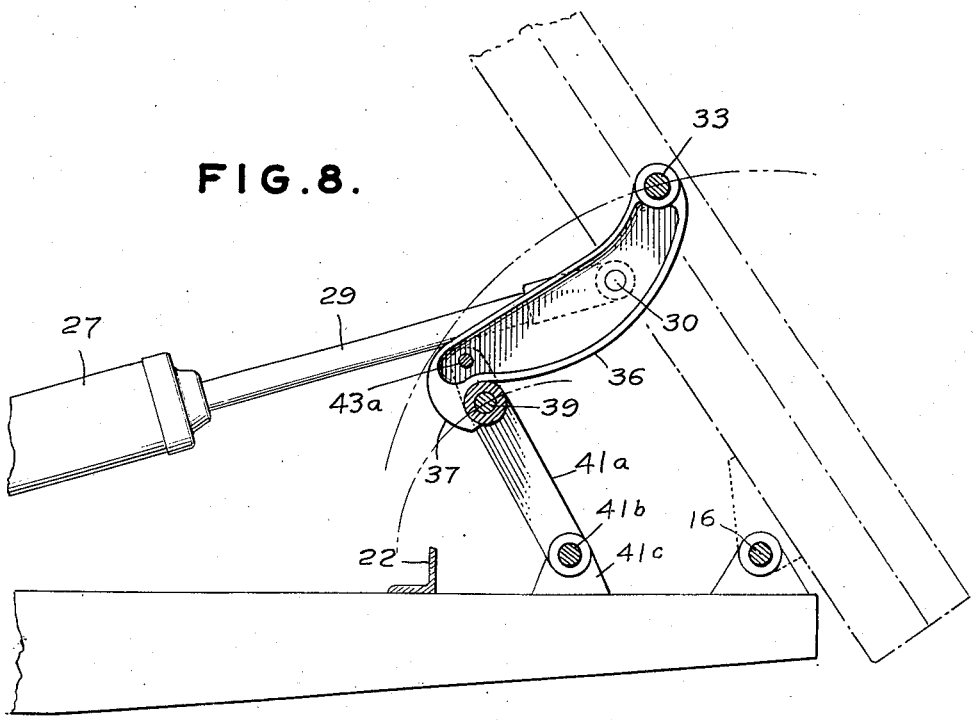

Patented Aug. 6, 1940

2,210,143

UNITED STATES PATENT OFFICE 2,210,143

TRUCK DUMPING MECHANISM

Herbert O. Day, Bowling Green, Ohio

Application December 29, 1937, Serial No. 182,213
Renewed January 13, 1940

14 Claims. (Cl. 298—22)

This invention relates to improvements in actuating mechanism for the tiltable body of load dumping vehicles, and more particularly to the design of a body tilting mechanism for motor dump trucks.

A tilting mechanism of the type herein contemplated has a power cylinder with its rear or base end portion pivotally mounted upon or relative to the chassis frame, so as to be capable of angular movement incident to causing the tilting of the body.

In such a mechanism two design factors are desired that are rather conflicting—on the one hand mechanical and kinematic efficiency, and on the other hand structural compactness as regards the assembly of the mechanism with the truck as a whole. With regard to compactness it is a desideratum that, with the body down, this mechanism should occupy a minimum of space vertically as between the chassis and the truck body in order that the total structural height may be kept at a minimum, and incidentally making it desirable that with the body in its down position the power cylinder should occupy an approximately horizontal, and therefore in some respects a kinematically unfavorable position.

As for mechanical and kinematic efficiency the requirement is for adequate and suitable lifting—or body tilting forces to be effective during all phases of the power stroke of the jack device.

Consequently, it is a resulting problem that, in spite of an approximately horizontal position of the power cylinder as dictated by the minimum vertical space requirement, proper lifting and tilting forces should come into play.

Another requirement is to have the forces so controlled, and the tilting movement so limited as to prevent the overthrow of the body in tilted position.

As a consequence of these requirements or problems, one object of this invention is the design of an efficient as well as compact body tilting mechanism having minimum vertical space requirement.

Another object is the design of a body tilting mechanism which is simple in construction, reliable in function, and which has desirable mechanical and kinematic characteristics.

Still another object is that the mechanism should be capable of being readily adapted to or designed for incorporation in trucks of various standard makes, preferably without considerable change or weakening of the standard truck chassis or changes of the truck body; in other words, an object is to make possible a conversion by simple means of a standard type truck into a load dumping truck.

Features of this invention are found to lie in kinematic and otherwise structural characteristics of the tilting mechanism and characteristics of supporting framework thereof.

According to one feature the tilting or lifting of the body is effected through a certain coaction of a jack-like device with a swingable cam-faced member pivoted upon the body and movable together therewith, and a roller associated with the cam-face of the member and supported from the chassis; otherwise expressed according to this feature the power device through the thrust of its connecting rod causes the tilting of the body by way of what may be called a complex action effect, in that the cam-faced member braces itself in sliding engagement upon a cam roller construction supported from the chassis frame.

According to another feature, a peculiar and what may be termed a combined toggle and cam action effect represents the initial phase of the body tilting movement, whereas direct ram action substitutes itself instead at an intermediate point of the power stroke in the concluding phase of the tilting movement.

Still another feature lies in the dual function of the swingable cam faced member in that the same acts as a position defining or position fixing catch.

In one of a number of possible embodiments of this invention the power stroke automatically passes from its cam action phase into the ram action phase when a hook shaped portion or catch virtually constituting the swingable end portion of the cam member, engages over and becomes locked relative to the cam roller. The cam roller in turn is mounted upon a special supporting construction or base which is swingable about the pivotal point of the body upon the chassis. The effect is that, at a desirable intermediate point of the power stroke, cam action becomes ineffective due to the locked relationship of the respective members, and straight cam action substitutes itself instead.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 1 is a partial sectional side view of the body tilting mechanism assembled.

Fig. 2 is a plan view of the mechanism shown in Fig. 1.

Figs. 3–6 are semi-diagrammatic detailed views of characteristic operating positions of the mechanism.

Figs. 7 and 8 illustrate a kinematically, partly modified embodiment of the invention.

One manifestation of the improved body tilting mechanism of this invention is shown to be embodied in a truck of which, according to Figs. 1 and 2, there is shown a chassis frame 10 comprising side members 11 and transverse end portions 12. The bottom portion of a tiltable truck body, fractionally indicated at 13, is shown to have longitudinal beams 14 and transverse beams 15, the body being pivotally mounted upon or hinged to the chassis frame by means of an axle 16 and brackets 17 and 18 fixed to the chassis and the body respectively. The chassis frame carries an auxiliary frame upon which is mounted the tilting mechanism proper.

This auxiliary frame comprises longitudinal members 19 and 20, and transverse members 21 and 22 resting upon the main—or chassis frame. A pair of tension elements 23 and 24 are connected at one end with the transverse member 22, namely, at 25 and 26 respectively, while their other end is mounted upon the axle 16.

The tilting mechanism proper comprises a jack-like device having a hydraulic power cylinder 27 with control valve and other appurtenances collectively indicated at 28, and having a jack rod 29 and a cross head 30 therefor journaled in a pair of symmetrically disposed swingable cam faced members 31 and 32 which are pivotally mounted at the lower side of the truck body by means of an axle 33 having bearings 34 and 35 (shown in dot and dash) mounted upon the longitudinal structural profile members 14 and 14a of the truck body.

Each of the swingable cam members 31 and 32 has a body portion having a downwardly curved or convex cam face 36 and a hook shaped end portion 37, the cam members extending from their pivot point in a direction substantially counter to the jack cylinder and consequently in a generally horizontal direction when in the position of Fig. 1.

More specifically as shown in the plan view of Fig. 2 the cam members extend towards and past the head of the jack cylinder flanking the same symmetrically; in other words, extending into the clear space available to the right and the left of the jack cylinders 27 and which space is bounded by the members 19 and 20 of the auxiliary supporting frame.

The cam members 31 and 32 are adapted to cooperatively engage upon cam rollers 38 and 39 respectively, which rollers in turn are mounted upon a supporting construction or frame mounted upon and swingable about the axle 16 and comprising arms 40 and 41 spaced by a sleeve 42 surrounding the axle 16. The free end portions of the arms 40 and 41 have mounted thereon the cam rollers 38 and 39 respectively, and which arms are provided with extensions 43 and 43a serving to insure contact between the cam rollers and the cam members by reaching over and around a marginal flange portion of the cam members substantially as shown. In the position of Fig. 1 the arms 40 and 41 are shown to rest upon the transverse member 22 of the auxiliary frame.

The mounting of the power cylinder 27 upon the auxiliary supporting frame is accomplished by way of a special swingable frame surrounding the cylinder. That is to say, the cylinder foot portion is seated upon the transverse base member 44 which is journaled in bearings 45 and 46 shown to be mounted upon the side members 19 and 20 respectively of the auxiliary supporting frame. A collar 47 surrounding the head portion of the cylinder is connected through symmetrically arranged diagonal bracing members 48 and 49 with respective end portions of the transverse base member 44. Tension rods 50 and 51 are shown to extend parallel to and symmetrically along the sides of the cylinder to connect the collar 47 with the transverse base member 44 in the manner shown.

The operation of the mechanism in the tilting of the body will be clear from Fig. 1 in conjunction with the various operating positions shown in Figs. 3 to 6.

In Fig. 1 the truck body is down upon the chassis frame and accordingly the mechanism is shown at rest with all members thereof in substantially horizontally extending positions indicating a compactness of arrangement which satisfies a minimum vertical space requirement, and whereby a tentative freedom from interference is attained as between parts of this mechanism and parts of the truck construction.

For the sake of clarity Fig. 3 repeats the initial position of the characteristic parts of the mechanism shown in Fig. 1, and accordingly the jack rod 29 is as yet fully retracted into the power cylinder 27.

In Fig. 4 the jack-like device has somewhat expanded. The power-cylinder accordingly has slightly risen as the jack rod 29 emerges therefrom under hydraulic pressure and is shown to have forced the cam faced member 32 part way up and over the associated cam faced roller 39, while in pressure engagement therewith. The downward convex curvature of the cam face 36 upon the cam faced member is shown to be of suitable proportions and shape to be effective to permit and promote the further forcing upward of the arm 32 until the hook portion 37 thereof will close in over the cam roller 39, thereby to terminate the initial or cam action phase of the power stroke as shown in Fig. 5.

In the Fig. 5 position, and depending upon specific design and dimensioning of the respective elements of the mechanism, the truck body (here indicated in dot and dash) may have been tilted to a degree at which the dumping or unloading will take place, and according to one feature of the invention the construction may be such that this will constitute the final tilting position.

However, according to another feature there may follow an additional tilting phase and which herein has been termed the ram action phase (as distinguished from the initial or cam action phase) illustrated by the position of the elements as shown in Fig. 6. This is when expansion of the jack device has caused the cam roller carrying arms 40 and 41 to swing upward while remaining in fixed and locked relationship with the associated cam members 31 and 32 respectively, the jack device then having reached its final and limited stage of expansion corresponding to a degree of body tilt as shown.

In Figs. 7 and 8 a kinematically somewhat modified action takes place during the second or ram action phase of the tilting stroke. This is due to the fact that the cam roller supporting frame shown in Figs. 1 to 6 as swingable about the axle 16, is now given its independent pivotal center relative to and upon the chassis frame (see Figs. 7 and 8). Accordingly, the swingable frame carrying the cam rollers 39 comprises a member 41a mounted upon an axle 41b carried in bearing members or journals 41c upon the chassis frame. Accordingly, there takes place with this modified arrangement something similar to a parallel motion effect, with Fig. 7 indicating an intermediate phase and Fig. 8 a final phase thereof, after the hook portion 37 has entered into quasi-pivotal operative engagement with the auxiliary frame 41a, by virtue of the engagement of the hook portion 37 upon the roller 39.

It is further important to note (see Figs. 1 and 3 to 5) that during the operating cycle of the mechanism; that is to say, during any phase of the tilting stroke, at no time does the hook 37 on the end of the cam-shaped member 32 project below the top of the chassis frame to interfere with cross-members or other parts which may be mounted thereon. This is provided for because of the desirability that a mechanism be produced which will adapt itself to any chassis without change, not only of the truck and body, but also of the tilting mechanism as well.

I claim:

1. A body tilting mechanism for load dumping vehicles having a chassis frame and a tiltable body pivotally mounted relative thereto, which mechanism comprises an expansible telescoping jack-like device having its base end portion pivotally mounted relative to said chassis frame for up and down swingable movement relative thereto; an arm-like member swingably mounted upon and extending from the bottom portion of the body in a direction substantially opposed to the direction in which said jack-like device extends from its pivotally mounted base end portion, the pivotal point of said armlike member being substantially horizontally spaced from the pivotal point of said jacklike device toward the pivotal point of the body when the body is in its lower position, the free end portion of said jack-like device being pivotally connected with said armlike member at a point intermediate the ends thereof, said arm-like member having therealong and intermediate its ends a substantially downwardly convex cam-faced portion; relatively stationary cam roller means supported by the chassis frame and engageable by said cam-faced portion of the swingable arm-like member, said cam faced portion being so designed and the pivotal centers of said armlike member, of said cam roller means, and of the pivotal connection of the jack device with the armlike member being so interrelated, that the expansion of the jacklike device will tilt the body from its lower position through an initial phase of upward angular movement.

2. A body tilting mechanism according to claim 1, in which the pivotal center of the connection between the jack device and the arm-like member is disposed at least as high as the pivotal center of the cam roller means and lower than the pivotal center of the arm-like member.

3. A body tilting mechanism according to claim 1, in which the pivotal center of the connection between the jack device and the arm-like member is disposed substantially at an elevation within the space defined by the center to center distance of the pivotal center of the arm-like member and that of the cam roller means.

4. A body tilting mechanism according to claim 1, in which the parts of the mechanism and the pivotal points involved in the movement thereof, namely, the point intermediate the ends of the arm-like member, the pivotal center of the arm-like member itself, and the center of the cam roller means, are kinematically coordinated in a manner to avoid interference or intersection of the cam roller axis with the expanding portion of the jack device.

5. A body tilting mechanism according to claim 1, in which the body is pivotally mounted with respect to the rear end portion of the chassis frame, with the addition of an auxiliary frame supported upon the chassis frame and having tension connection with the rear end portion of the chassis frame by way of the pivotal connection of the body with the chassis frame.

6. A body tilting mechanism according to claim 1, in which the pivotal center of the armlike member is disposed substantially vertically above the pivotal center of the cam rollers when the body is in its lower position.

7. A body tilting mechanism according to claim 1 in which the pivotal center of the armlike member is disposed above the pivotal center of the cam rollers and to the left of the vertical center line thereof.

8. A body tilting mechanism according to claim 1 in which the pivotal center of the armlike member is disposed substantially vertically above the pivotal center of the cam rollers when the body is in its lower position, and in which the pivotal center of the connection between the jack device and the armlike member is disposed at least as high as the pivotal center of the cam roller means and lower than the pivotal center of the armlike member.

9. A body tilting mechanism for load dumping vehicles having a chassis frame and a tiltable body pivotally mounted relative thereto, which mechanism comprises an expansible and telescoping jack-like device having its base end portion pivotally mounted relative to said chassis frame for up and down swingable movement relative thereto; a swingable member having a suitable cam face provided along a suitable portion thereof, and mounted upon and extending from the bottom portion of the body in a direction substantially opposed to said jack-like device, the free end portion of said jack-like device pivotally engaging with said member; and a cam roller supported from the chassis frame and disposed for cooperative engagement with the cam face of said swingable element at least during the body lifting power stroke of said jack device causing said member to brace itself upon said cam roller during the tilting of the body, and an auxiliary carrying construction upon which the cam roller is mounted, said carrying construction in turn being mounted to be swingable about the pivotal axis of the body, said cam faced member being adapted to become fixed or locked relative to the auxiliary carrying construction at an intermediate point of the body tilting movement due to the initial expansion of the jack-like device, said auxiliary carrying construction being swung about its pivotal axis after said cam faced member has become so fixed relative thereto as a result of continued expansion of said jack device.

10. A mechanism according to claim 9, in which said cam faced member has a hook-shaped portion whereby it becomes engaged relative to said auxiliary construction.

11. A mechanism according to claim 9, in which said cam faced member has a free end portion adapted to become engaged upon said cam roller.

12. A body tilting mechanism for load dumping vehicles having a chassis frame and a tiltable body pivotally mounted relative thereto, which mechanism comprises an expansible and telescoping jack-like device having its base end portion pivotally mounted relative to said chassis frame for up and down swingable movement relative thereto; a swingable member having a suitable cam face provided along a suitable portion thereof, and mounted upon and extending from the bottom portion of the body in a direction substantially opposed to said jack-like device, the free end portion of said jack-like device pivotally engaging with said member; and a cam roller supported from the chassis frame and disposed for cooperative engagement with the cam face of said swingable element at least during the body lifting power stroke of said jack device causing said member to brace itself upon said cam roller during the tilting of the body, and an auxiliary carrying construction upon which the cam roller is mounted, said carrying construction in turn being mounted to be swingable about a pivotal axis which is spaced from the pivotal axis of the tiltable body and relative to the chassis frame, and in which the swingable cam-faced member is adapted to enter into quasi-pivotal engagement with the auxiliary carrying construction at an intermediate point of the body tilting movement due to the initial expansion of the jack-like device, said auxiliary construction being swung about its pivotal axis after said cam faced member has become engaged relative thereto as a result of continued expansion of said jack device.

13. A mechanism according to claim 12, in which said cam faced member has a hook-shaped portion whereby it becomes engaged relative to said auxiliary construction.

14. A mechanism according to claim 12, in which said cam faced member has a free end portion adapted to become engaged upon said cam roller.

HERBERT O. DAY.